US007817453B2

(12) United States Patent
Nerone

(10) Patent No.: US 7,817,453 B2
(45) Date of Patent: Oct. 19, 2010

(54) THERMAL FOLDBACK FOR LINEAR FLUORESCENT LAMP BALLASTS

(75) Inventor: Louis Robert Nerone, Brecksville, OH (US)

(73) Assignee: General Electric Company, Schenectady, NY (US)

( * ) Notice: Subject to any disclaimer, the term of this patent is extended or adjusted under 35 U.S.C. 154(b) by 281 days.

(21) Appl. No.: 12/141,545

(22) Filed: Jun. 18, 2008

(65) Prior Publication Data

US 2009/0058302 A1 Mar. 5, 2009

Related U.S. Application Data

(60) Provisional application No. 60/968,211, filed on Aug. 27, 2007.

(51) Int. Cl.
*H02M 5/16* (2006.01)

(52) U.S. Cl. ....................... 363/172; 363/171; 363/170; 363/157; 363/16

(58) Field of Classification Search ............. 315/209 R, 315/224, 225, 219, 246, 247, 274, 278, 276, 315/309, 307, 312, 324, 354, 351, 350; 361/38, 361/37, 35, 42, 103; 363/34, 37, 38, 40, 363/50, 55, 56.03, 56.04, 56.05, 157, 165, 363/21.08, 21, 16, 172, 171, 170
See application file for complete search history.

(56) References Cited

U.S. PATENT DOCUMENTS 5,430,632 A * 7/1995 Meszlenyi .................. 363/17
5,982,106 A 11/1999 Bobel
7,274,574 B1 * 9/2007 Biegel ......................... 363/16
2007/0176564 A1 8/2007 Nerone et al.

FOREIGN PATENT DOCUMENTS

| | | |
|---|---|---|
| CA | 2 610 473 | 12/2006 |
| EP | 0 848 580 A | 6/1998 |

OTHER PUBLICATIONS

PCT/US2008/068751 International Search Report, mailed Mar. 27, 2008.

* cited by examiner

*Primary Examiner*—Tuyet Thi Vo
(74) *Attorney, Agent, or Firm*—Fay Sharpe LLP

(57) ABSTRACT

A ballast circuit that facilitates providing thermal protection for a fluorescent lamp includes a coupling transformer that couples an inverter circuit to a control circuit. First and second transformer windings in the inverter circuit, and a third transformer winding in the control circuit, are wound around a common ferrite core. The ferrite core has a Curie temperature that approximates a maximum allowable threshold temperature for the lamp. When the temperature of the ballast approaches the Curie temperature of the ferrite core, its permeability, and thus inductance, drops dramatically, causing an increase in operating frequency in the inverter circuit. This increased operating frequency causes a capacitor in the control circuit to charge to a threshold voltage, at which power to the inverter circuit is reduced. The lamp then dims without turning off until the temperature is reduced to an acceptable level.

17 Claims, 3 Drawing Sheets

THERMAL FOLDBACK FOR LINEAR FLUORESCENT LAMP BALLASTS

This application claims the benefit of provisional patent application Ser. No. 60/968,211, filed Aug. 27, 2007, which is incorporated by reference in its entirety herein.

BACKGROUND OF THE INVENTION

The present application is directed to electronic ballasts. It finds particular application in conjunction with the resonant inverter circuits that operate one or more fluorescent lamps and will be described with the particular reference thereto. However, it is to be appreciated that the following is also amenable to high intensity discharge (HID) lamps and the like.

A ballast is an electrical device which is used to provide power to a load, such as an electrical lamp, and to regulate the current provided to the load. The ballast provides high voltage to start a lamp by ionizing sufficient plasma (vapor) for the arc to be sustained and to grow. Once the arc is established, the ballast allows the lamp to continue to operate by providing proper controlled current flow to the lamp.

Typically, after the alternating current (AC) voltage from the power source is rectified and appropriately conditioned, the inverter converts the DC voltage to AC. The inverter typically includes a pair of serially connected switches, such as MOSFETs which are controlled by the drive gate control circuitry to be "ON" or "OFF".

One approach to operate multiple fluorescent lamps connected in parallel is to use a design similar to driving a single lamp, where each lamp is operated by a dedicated inverter, e.g. n lamps require n inverters. However, this approach is costly.

The following contemplates new methods and apparatuses that overcome the above referenced problems and others.

BRIEF DESCRIPTION OF THE INVENTION

According to an aspect, a ballast circuit for providing thermal protection comprises an inverter circuit having primary and secondary windings around a core of a coupling transformer, and a control circuit having a tertiary winding around the core of the coupling transformer. The core of the coupling transformer comprises a ferrite material with a Curie temperature that is approximately equal to a maximum threshold temperature level of a housing for the ballast circuit.

According to another aspect, a ballast circuit for folding back input power for thermal protection comprises a transformer having first, second, and third windings around a ferrite core that has a Curie temperature in the range of approximately 85° C. to approximately 95° C., an inverter circuit that includes the first and second windings, and a control circuit that includes the third winding, wherein the permeability of the ferrite core and the inductance of the first, second, and third windings, decreases when the temperature of the ballast approaches the Curie temperature of the ferrite core. The operating frequency of the inverter circuit approximately doubles in response to the decreased inductance in the first and second windings. Power to the inverter circuit is reduced in response to the increased operating frequency of a signal received by the control circuit.

According to yet another aspect, a ballast for providing thermal protection comprises a coupling transformer having first, second, and third windings around a ferrite core that has a Curie temperature of approximately 90° C., an inverter circuit that includes the first and second windings, and a control circuit that includes the third winding. The permeability of the ferrite core decreases from approximately 10,000 H/m to approximately 1 H/m when the temperature of the ballast approaches 90° C., and the inductance of the first, second, and third windings decreases from approximately 1 mH to approximately 50 μH in response to the decrease in permeability. The operating frequency of the inverter circuit increases from approximately 70 kHz to approximately 130 kHz in response to the decreased inductance in the first and second windings, and an approximately 130 kHz signal is received at the control circuit from the inverter circuit and charges a capacitor to a threshold voltage level. Power to the inverter circuit is reduced when the capacitor reaches the threshold voltage level.

DETAILED DESCRIPTION OF THE INVENTION

Figure 1:
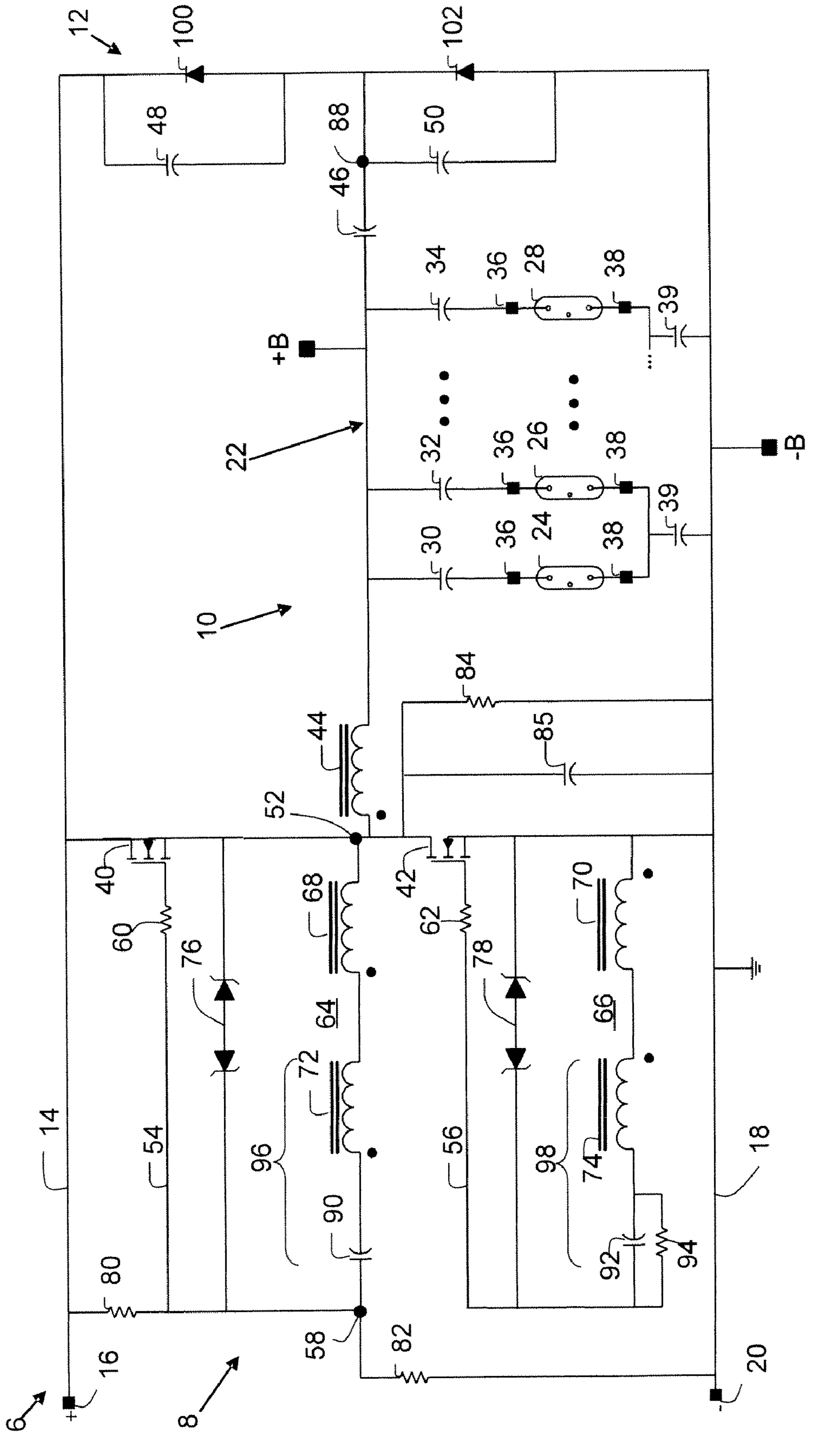
FIG. 1 is a diagrammatic illustration of a ballast circuit includes a plurality of inductor windings on a ferrite core having a Curie temperature that is approximately equal to a maximum threshold temperature for a ballast housing, such that as the temperature of the ferrite core approaches its Curie temperature, the permeability of the core drops, causing the inductance to decrease, further causing the circuit 6 to fold back to provide thermal protection for the circuit.

With reference to FIG. 1, a ballast circuit 6 includes a plurality of inductor windings on a ferrite core having a Curie temperature that is approximately equal to a maximum threshold temperature for a ballast housing, such that as the temperature of the ferrite core approaches its Curie temperature, the permeability of the core drops, causing the inductance to decrease, further causing the circuit 6 to fold back to provide thermal protection for the circuit 6. The low Curie temperature of the ferrite core facilitates folding back input power, and thus the amount of power dissipated by the ballast circuit 6, to reduce the housing temperature rise when subjected to adverse ambient conditions. That is, the Curie temperature of a ferrite material that defines the magnetic path of a mutually coupled inductor is exploited to achieve thermal protection for the ballast and housing. Since this inductor controls the operating frequency of the inverter stage of the ballast and consequently the lamp power, the power dissipated by the ballast decreases as the ferrite core approaches its Curie temperature. The low Curie temperature of the ferrite core material also assists in maintaining the case temperature of the ballast below a desired threshold temperature (e.g., approximately 85-95 degrees Celsius). Moreover, the selective ferrite Curie temperature of the mutually coupled inductor allows the ballast to operate in high ambient temperatures, which mitigates a need for a thermal switch that can interrupt the input power, as used in conventional systems, which causes lamps coupled to the ballast to extinguish. In this manner, the ballast 6 with low Curie temperature ferrite core material facilitates providing a cost-effective solution that does not require an additional component such as a thermal switch to interrupt power. That is, power need not be interrupted, but rather is folded back, to reduce internal power dissipation while still providing lamp power, and therefore the lamps continue to produce light.

The ballast circuit 6 includes an inverter circuit 8, a resonant circuit or network 10, and a clamping circuit 12. A DC voltage is supplied to the inverter 8 via a voltage conductor 14 running from a positive voltage terminal 16 and a common conductor 18 connected to a ground or common terminal 20. A high frequency bus 22 is generated by the resonant circuit 10 as described in more detail below. Additionally, the high-frequency bus 22 is connected to a node, labeled "+B," which in turn is connected to a controller circuit 108, described in greater detail below. First, second, . . . , nth lamps 24, 26, . . . , 28 are coupled to the high frequency bus via first, second, . . . , nth ballasting capacitors 30, 32, 34. Thus if one lamp is removed, the others continue to operate. It is contemplated that any number of lamps can be connected to the high frequency bus 22. E.g., each lamp 24, 26, . . . , 28 is coupled to the high frequency bus 22 via an associated ballasting capacitor 30, 32, . . . , 34. Power to each lamp 24, 26, . . . , 28 is supplied via respective lamp connectors 36, 38. Lamp connectors 38 are connected pairwise to respective blocking capacitors 39.

The inverter 8 includes analogous upper and lower or first and second switches 40 and 42, for example, two n-channel MOSFET devices (as shown), serially connected between conductors 14 and 18, to excite the resonant circuit 10. Two P-channel MOSFETs may also be configured. The high frequency bus 22 is generated by the inverter 8 and the resonant circuit 10 and includes a resonant inductor 44 and an equivalent resonant capacitance which includes the equivalence of first, second and third capacitors 46, 48, 50, and ballasting capacitors 30, 32, . . . , 34 which also prevent DC current flowing through the lamps 24, 26, . . . , 28. The ballasting capacitors 30, 32, . . . , 34 are primarily used as ballasting capacitors.

The switches 40 and 42 cooperate to provide a square wave at a common or first node 52 to excite the resonant circuit 10. Gate or control lines 54 and 56, running from the switches 40 and 42 are connected at a control or second node 58. Each control line 54, 56 includes a respective resistance 60, 62.

With continuing reference to FIG. 1, first and second gate drive circuitry or circuit, generally designated 64, 66, is connected between the nodes 52, 58 and includes first and second driving inductors 68, 70 which are secondary windings mutually coupled to the resonant inductor 44 to induce in the driving inductors 68, 70 voltage proportional to the instantaneous rate of change of current in the resonant circuit 10. First and second secondary inductors 72, 74 are serially connected to the respective first and second driving inductors 68, 70 and the gate control lines 54 and 56. According to one embodiment, inductors 72 and 74 have a ferrite core with a Curie temperature of approximately 85° C. to approximately 95° C., although higher and or lower Curie temperatures are contemplated.

The gate drive circuitry 64, 66 is used to control the operation of the respective upper and lower switches 40 and 42. More particularly, the gate drive circuitry 64, 66 maintains the upper switch 40 "ON" for a first half of a cycle and the lower switch 42 "ON" for a second half of the cycle. The square wave is generated at the node 52 and is used to excite the resonant circuit 10. First and second bi-directional voltage clamps 76, 78 are connected in parallel to the secondary inductors 72, 74 respectively, each including a pair of back-to-back Zener diodes. The bi-directional voltage clamps 76, 78 act to clamp positive and negative excursions of gate-to-source voltage to respective limits determined by the voltage ratings of the back-to-back Zener diodes. Each bi-directional voltage clamp 76, 78 cooperates with the respective first or second secondary inductor 72, 74 so that the phase angle between the fundamental frequency component of voltage across the resonant circuit 10 and the AC current in the resonant inductor 44 approaches zero during ignition of the lamps.

Serially connected resistors 80, 82 cooperate with a resistor 84 and a capacitor 85, connected between the common node 52 and the common conductor 18, for starting regenerative operation of the gate drive circuits 64, 66. Upper and lower capacitors 90, 92 are connected in series with the respective first and second secondary inductors 72, 74. In the starting process, the capacitor 90 is charged from the voltage terminal 16 via the resistors 80, 82, 84. A resistor 94 shunts the capacitor 92 to prevent the capacitor 92 from charging. This prevents the switches 40 and 42 from turning ON, initially, at the same time. The voltage across the capacitor 90 is initially zero, and, during the starting process, the serially-connected inductors 68 and 72 act essentially as a short circuit, due to a relatively long time constant for charging of the capacitor 90. When the capacitor 90 is charged to the threshold voltage of the gate-to-source voltage of the switch 40, (e.g., 2-3 volts), the switch 40 turns ON, which results in a small bias current flowing through the switch 40. The resulting current biases the switch 40 in a common drain, Class A amplifier configuration. This produces an amplifier of sufficient gain such that the combination of the resonant circuit 10 and the gate control circuit 64 produces a regenerative action which starts the inverter into oscillation, near the resonant frequency of the network including the capacitor 90 and inductor 72. The generated frequency is above the resonant frequency of the resonant circuit 10, which allows the inverter 8 to operative above the resonant frequency of the resonant network 10. This produces a resonant current which lags the fundamental of the voltage produced at the common node 52, allowing the inverter 8 to operate in the soft-switching mode prior to igniting the lamps. Thus, the inverter 8 starts operating in the linear mode and transitions into the switching Class D mode. Then, as the current builds up through the resonant circuit 10, the voltage of the high frequency bus 22 increases to ignite the lamps, while maintaining the soft-switching mode, through ignition and into the conducting, arc mode of the lamps.

During steady state operation of the ballast circuit 6, the voltage at the common node 52, being a square wave, is approximately one-half of the voltage of the positive terminal 16. The bias voltage that once existed on the capacitor 90 diminishes. The frequency of operation is such that a first network 96 including the capacitor 90 and inductor 72 and a second network 98 including the capacitor 92 and inductor 74 are equivalently inductive. That is, the frequency of operation is above the resonant frequency of the identical first and second networks 96, 98. This results in the proper phase shift of the gate circuit to allow the current flowing through the inductor 44 to lag the fundamental frequency of the voltage produced at the common node 52. Thus, soft-switching of the inverter 8 is maintained during the steady-state operation.

With continuing reference to FIG. 1, the output voltage of the inverter 8 is clamped by serially connected clamping diodes 100, 102 of the clamping circuit 12 to limit high voltage generated to start the lamps 24, 26, . . . , 28. The clamping circuit 12 further includes the second and third capacitors 48, 50, which are essentially connected in parallel to each other. Each clamping diode 100, 102 is connected across an associated second or third capacitor 48, 50. Prior to the lamps starting, the lamps' circuits are open, since impedance of each lamp 24, 26, . . . , 28 is seen as very high impedance. The resonant circuit 10 is composed of the capacitors 30, 32, . . . , 34, 46, 48, 50 and the resonant inductor 44 and is driven near resonance. As the output voltage at the common node 52 increases, the clamping diodes 100, 102 start to clamp, preventing the voltage across the second and third capacitors 48, 50 from changing sign and limiting the output voltage to the value that does not cause overheating of the inverter 8 components. When the clamping diodes 100, 102 are clamping the second and third capacitors 48, 50, the resonant circuit 10 becomes composed of the capacitors 30, 32, . . . , 34, 46 and the resonant inductor 44. E.g., the resonance is achieved when the clamping diodes 100, 102 are not conducting. When the lamps ignite, the impedance decreases quickly. The voltage at the common node 52 decreases accordingly. The clamping diodes 100, 102 discontinue clamping the second and third capacitors 48, 50 and the ballast 6 enters steady state operation. The resonance is dictated again by the capacitors 30, 32, . . . , 34, 46, 48, 50 and the resonant inductor 44.

In the manner described above, the inverter 8 provides a high frequency bus at the common node 52 while maintaining the soft switching condition for switches 40, 42. The inverter 8 is able start a single lamp when the rest of the lamps are lit because there is sufficient voltage at the high frequency bus to allow for ignition.

It is to be appreciated that the foregoing techniques and/or arrangements can be applied in a complementary inverter with a similar control transformer, which is constructed with a ferrite core material having a Curie temperature near the temperature at which power should be reduced to improve the reliability of the ballast.

Figure 2:
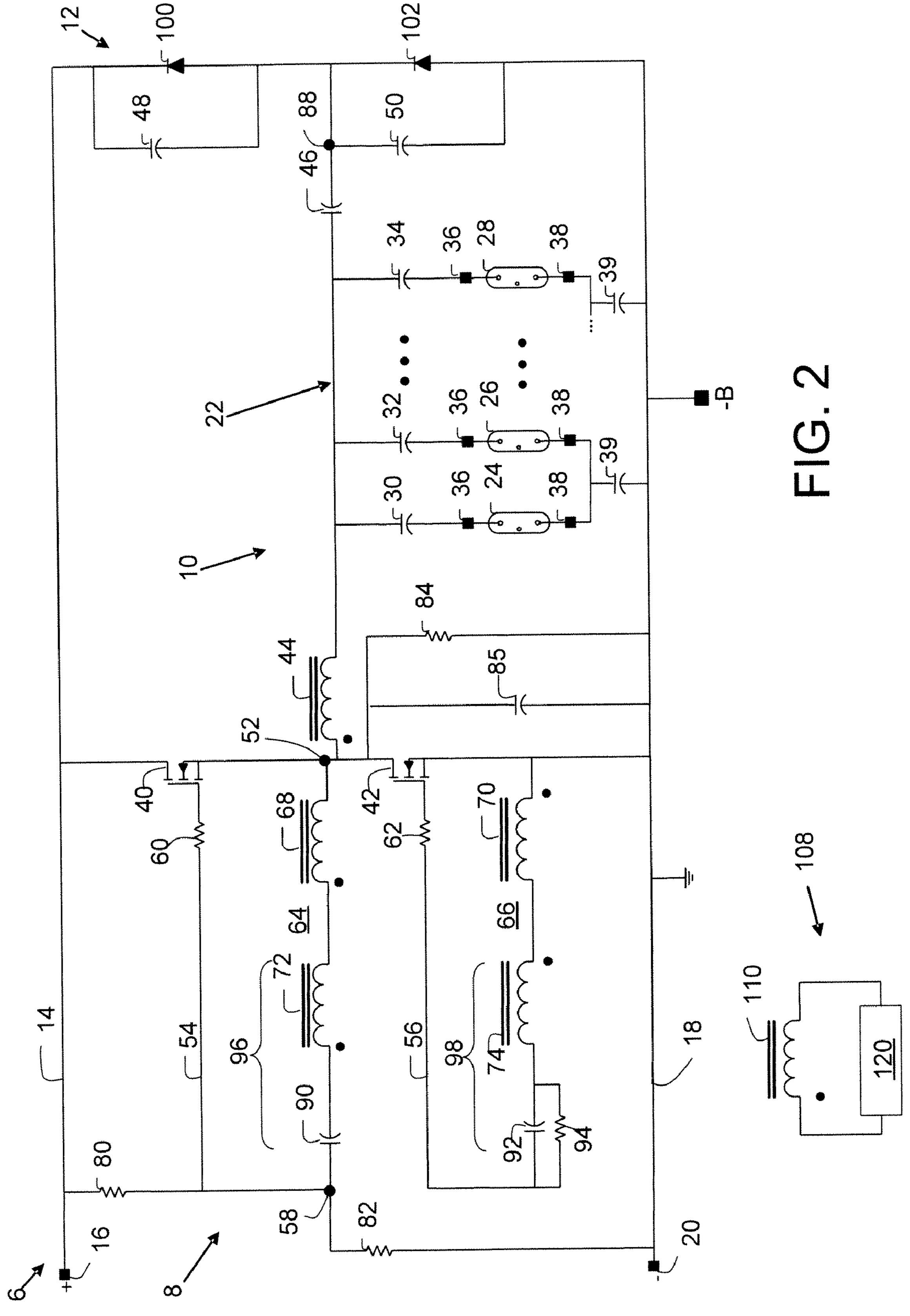
FIG. 2 is an illustration of the ballast circuit and a corresponding control circuit coupled thereto.
Figure 3:
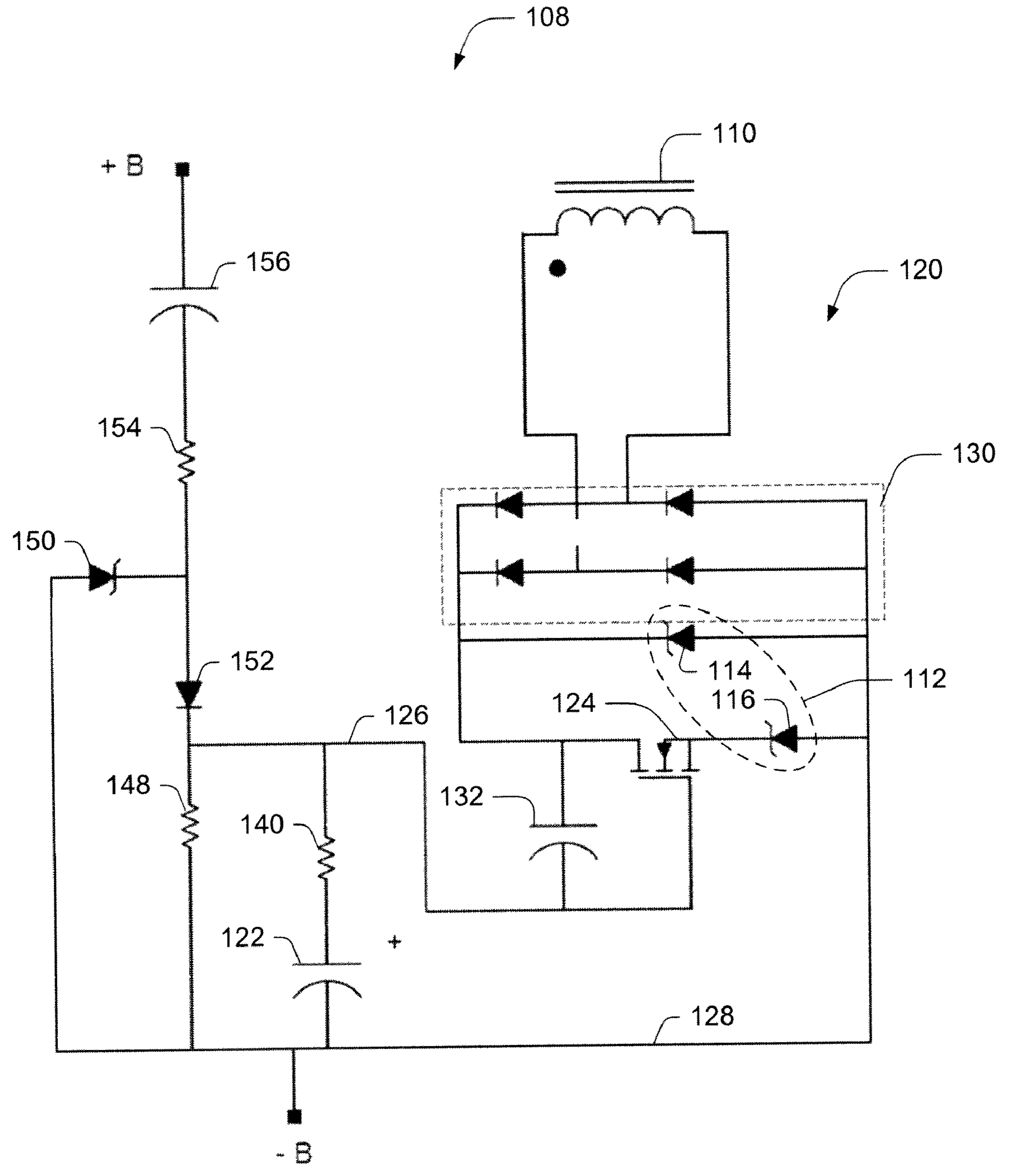
FIG. 3 is an illustration of a more detailed diagram of the control circuit.

With reference to FIGS. 2 and 3, a tertiary circuit 108 is coupled to the inverter circuit 8. More specifically, a tertiary winding or inductor 110 is mutually coupled to the first and second secondary inductors 72, 74, and the circuit 108 is hardwired to the ballast circuit 6 via node +B. Additionally, FIGS. 1-3 include a node "−B," which can be a ground. In this embodiment, the first and second bi-directional voltage clamps 76, 78 are optionally omitted. An auxiliary or third voltage clamp 112, which includes first and second Zener diodes 114, 116, is connected in parallel to the tertiary inductor 110. Because the tertiary inductor 110 is mutually coupled to the first and second secondary inductors 72, 74, the auxiliary voltage clamp 112 simultaneously clamps the first and second gate circuits 64, 66.

Different values of the Zener diodes 114, 116 of the voltage clamp 112 are useful in allowing the ballast 6 to change the current and subsequently the power provided to the lamps 24, 26, . . . , 28. As known in the art, in an instant-start ballast, the initial mode of the lamp operation is glow. In the glow mode, the voltage across the lamp electrodes is high, for example, 300V. The current which flows in the lamp is typically lower than the running current, for example, 40 or 50 mA instead of 180 mA. The electrodes heat up and become thermionic. Once the electrodes become thermionic, the electrodes emit electrons into the plasma and the lamp ignites. Once the lamp ignites, the different amount of power is to be delivered to the each of the ballasts since each ballast runs at a nominal current different level of a nominal current.

For example, during ignition of the lamps 24, 26, . . . , 28, the clamping voltage of the tertiary winding 110 is increased to allow more glow power. After the lamps have started, the voltage can be folded back to allow the correct steady-state current to flow. This function can be implemented via a controller 120.

More specifically, prior to ignition, a capacitor 122 is discharged, causing a switch 124, such as a MOSFET, to be in the "OFF" state. When the inverter 8 starts to oscillate, the capacitor 122 charges via lines 126 and 128. The tertiary winding 110 is clamped by parallel-connected first and second Zener diodes 114, 116 that are coupled to the drain and source of the MOSFET 124. When a high-power start mode is employed in the controller 120, a high-frequency of the input signal causes the capacitor 122 to charge, which causes Zener diode 116 to turn, which in turn causes MOSFET 124 to turn ON and the control circuit to start regulating. That is, once the capacitor 122 charges to a predefined voltage (e.g., approximately 8V), such as the threshold voltage of the MOSFET 124, the MOSFET 124 turns ON and current is shunted away from the second Zener diode 116 that is connected to the source terminal of the MOSFET 124. The capacitor 122 is connected in series with a resistor 140, and a capacitor 132 is connected to the gate and drain of the MOSFET 124. A resistor 148 is connected in parallel to the resistor 140 and capacitor 122. Thus, the higher voltage clamping of the tertiary winding 110 allows more glow power to be achieved until the lamps 24, 26, . . . , 28 start. The circuit 108 further includes a diode 150, a third Zener diode 152, a resistor 154, and a capacitor 156, which is connected to node +B (e.g., the tie-in point to high-frequency bus 22 of the ballast circuit 6).

After a period of time, such as for example from about 0.5 to about 1.0 seconds, the MOSFET 124 turns ON, causing the tertiary winding 110 to be clamped at a lower voltage. This allows the lower steady-state lamp power to be achieved. Thus, the switching of the clamping voltage, such as the switching of the voltage clamping of the tertiary winding 110 via the Zener diodes 114, 116, causes an increase in the power applied to the lamps 24, 26, . . . , 28 during the glow stage but folds back this power to allow the lamps 24, 26, . . . , 28 to operate under normal predetermined power levels of the lamps 24, 26, . . . , 28.

In addition to the normal instant start function and the setting of various predetermined steady-state power limits, by controlling the tertiary winding 110, the ballast 6 can be used as a program start, rapid start ballast or instant start ballast in a variety of applications for different ballast factors.

According to an example, a voltage the ballast circuit 6 and control circuit 108 are employed in a voltage-fed self-oscillating inverter that powers a fluorescent lamp. The ferrite core of the transformer comprising inductors 72, 74, and 110 is formed of a low-Curie temperature ferrite material, wherein the Curie temperature of the material is approximately equal to a maximum allowable temperature for lamp housing in which the ballast is employed. For instance, a conventional ferrite core may have a Curie temperature of approximately 150 degrees Celsius, which exceeds a maximum threshold temperature for lamp housings. In accordance with various features described herein, the inductor windings 72, 74, and 110 are wound around a ferrite core having a Curie temperature in the range of approximately 85 degrees Celsius to approximately 95 degrees Celsius. For illustrative purposes and for the remainder of this example, it will be assumed that the Curie temperature of the ferrite core is approximately 90 degrees Celsius.

As the temperature of the ballast increases, such as occurs as power is dissipated in the circuit, and approaches 90 degrees Celsius, the permeability of the ferrite core decreases, causing inductance in the inductor 110 to decrease. Frequency in the ballast circuit 6 increases in response to the decrease in inductance, causing power into the lamps and the inverter input to fold back. Thus, when the ambient temperature of the ballast approaches approximately 90 degrees Celsius, the ballast circuit folds back and power applied to the inverter through the lamps is reduced to prevent a thermal runaway condition.

To further the above example, as the ferrite core temperature approaches its Curie temperature, the permeability of the ferrite core material drops from approximately 10,000-12,000 H/m down to approximately 1 H/m, causing the inductance of the windings 72, 74, 110 to be reduced from approximately 1 mH to approximately 50 μH. At 50 μH or so, the frequency of the coupling capacitor 122, and thus the operating frequency of the ballast 6, increases to approximately the resonant frequency. This in turn causes the lamps to dim, which prevents overheating as the ballast goes from operating at approximately 70 KHz to operating at approximately 130 KHz upon fold back. In this manner, thermal protection is provided without a need for additional components such as a thermal switch. Moreover, low-Curie temperature ferrite materials are not significantly more expensive than higher Curie temperature materials. Thus, the ballast is cheaply and effectively protected from thermal damage without interruption to light and without thermal switches that can be fatigued or fail.

It is to be appreciated that the foregoing example(s) is/are provided for illustrative purposes and that the subject innovation is not limited to the specific values or ranges of values presented therein. Rather, the subject innovation may employ or otherwise comprise any suitable values or ranges of values, as will be appreciated by those of skill in the art.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A ballast circuit for providing thermal protection, the ballast comprising:

an inverter circuit having primary and secondary windings around a core of a coupling transformer; and a control circuit having a tertiary winding around the core of the coupling transformer;

wherein the core of the coupling transformer comprises a ferrite material with a Curie temperature that is approximately equal to a maximum threshold temperature level of a housing for the ballast circuit.

2. The ballast as set forth in claim 1, wherein the Curie temperature of the ferrite material is in the range of approximately 85° Celsius to approximately 95° Celsius.

3. The ballast as set forth in claim 1, wherein the permeability of the ferrite core decreases as the temperature of the ferrite core approaches the Curie temperature of the ferrite core.

4. The ballast as set forth in claim 3, wherein the inductance in the first, second, and third windings decreases as the permeability of the ferrite core decreases.

5. The ballast as set forth in claim 4, wherein the operating frequency of the ballast circuit increases as the inductance in the first, second, and third windings decreases.

6. The ballast as set forth in claim 5, wherein the power dissipated in the ballast circuit decreases as the operating frequency of the ballast circuit increases.

7. The ballast as set forth in claim 3, wherein the permeability of the ferrite core decreases from between approximately 10 kH/m-12 kH/m down to approximately 1 kH/m as the temperature of the ferrite core approaches the Curie temperature.

8. The ballast as set forth in claim 7, wherein the inductance in the first, second, and third windings decreases from approximately 1 mH to approximately 50 μH as the permeability of the ferrite core decreases to approximately 1H/m.

9. The ballast as set forth in claim 8, wherein the operating frequency of the ballast increases from approximately 70 kHz to approximately 130 kHz as the inductance in the first, second, and third windings decreases to approximately 50 μH.

10. The ballast as set forth in claim 9, wherein the increased operating frequency causes a plurality of lamps coupled to the ballast circuit to dim, without shutting off, as power to the ballast circuit is reduced.

11. The ballast as set forth in claim 10, wherein the high frequency of the input into node B+ causes a capacitor in the control circuit to charge to approximately 8V, at which point the power to the ballast is reduced.

12. A ballast circuit for folding back input power for thermal protection, the ballast comprising:

a transformer having first, second, and third windings around a ferrite core that has a Curie temperature in the range of approximately 85° C. to approximately 95° C.;

an inverter circuit that includes the first and second windings;

a control circuit that includes the third winding;

wherein the permeability of the ferrite core and the inductance of the first, second, and third windings, decreases when the temperature of the ballast approaches the Curie temperature of the ferrite core;

wherein the operating frequency of the inverter circuit approximately doubles in response to the decreased inductance in the first and second windings; and wherein power to the inverter circuit is reduced in response to the increased operating frequency of a signal received by the control circuit.

13. The ballast as set forth in claim 12, wherein the permeability of the ferrite core is reduced to approximately 1/10000 of its initial value.

14. The ballast as set forth in claim 12, wherein the inductance in the first, second, and third windings decreases to approximately 1/20 of its initial value.

15. The ballast as set forth in claim 12, further including a capacitor in the control circuit that is charged as a result of high-frequency input to the control circuit.

16. The ballast as set forth in claim 15, wherein the capacitor is charged to approximately 8V, at which point power to the inverter circuit is reduced.

17. A ballast for providing thermal protection, comprising:

a coupling transformer having first, second, and third windings around a ferrite core that has a Curie temperature of approximately 90° C.;

an inverter circuit that includes the first and second windings; and a control circuit that includes the third winding;

wherein the permeability of the ferrite core decreases from approximately 10,000 H/m to approximately 1 H/m when the temperature of the ballast approaches 90° C.;

wherein the inductance of the first, second, and third windings decreases from approximately 1 mH to approximately 50 μH in response to the decrease in permeability;

wherein the operating frequency of the inverter circuit increases from approximately 70 kHz to approximately 130 kHz in response to the decreased inductance in the first and second windings;

wherein an approximately 130 kHz signal is received at the control circuit from the inverter circuit and charges a capacitor to a threshold voltage level; and wherein power to the inverter circuit is reduced when the capacitor reaches the threshold voltage level.

* * * * *